V. E. ROYLE.
ROUTING CUTTER.
APPLICATION FILED NOV. 17, 1915.
1,235,604.
Patented Aug. 7, 1917.
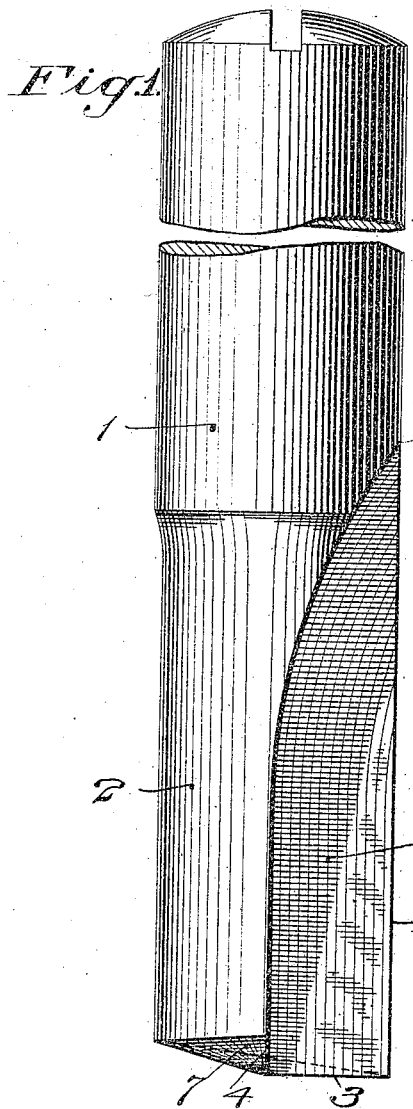
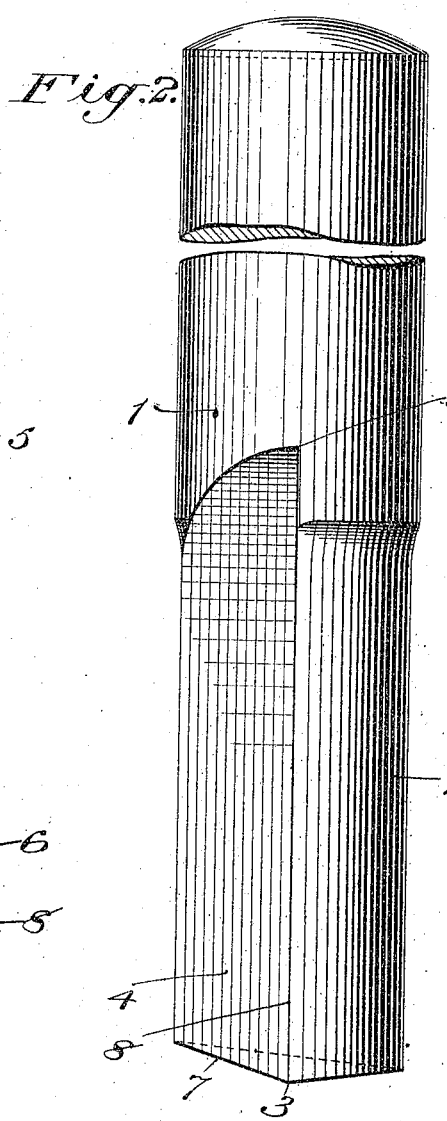
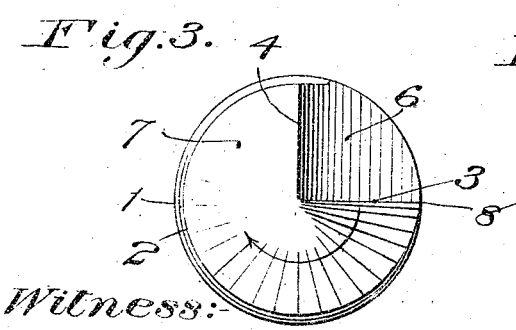
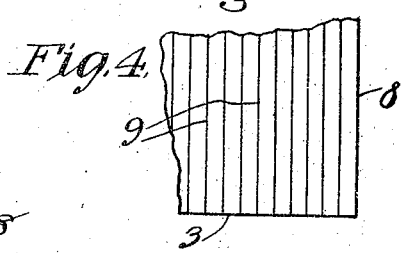
Witness:
Hyperion Barry.
Inventor:
Vernon E. Royle
By Brown & Seward
his Attorneys

UNITED STATES PATENT OFFICE.

VERNON E. ROYLE, OF PATERSON, NEW JERSEY.

ROUTING-CUTTER.

1,235,604. Specification of Letters Patent. Patented Aug. 7, 1917.

Application filed November 17, 1915. Serial No. 61,996.

*To all whom it may concern:*

Be it known that I, VERNON E. ROYLE, a citizen of the United States, and resident of Paterson, in the county of Passaic and State of New Jersey, have invented a new and useful Improvement in Routing-Cutters, of which the following is a specification.

My invention relates to routing cutters and more particularly to routing cutters for use in cutting the harder metals, with the object in view of providing a cutter which shall have great strength and durability.

It has been found in practice that where routing cutters are ground transversely of their length, the abraiding material will leave ridges and depressions which are plainly visible under a microscope, and that the cutters almost invariably break at the depressions between two of these ridges.

My present invention contemplates reinforcing the cutter by leaving a portion of the stock intact above the central longitudinal plane of the cutter and milling the cutter in the direction of its length so that such ridges as may be left by the milling tool will extend in the longitudinal direction of the cutter instead of transversely thereto, thereby producing no transverse depressions to favor breakage.

A practical embodiment of my invention is represented in the accompanying drawings in which, Figure 1 is a view of the cutter in side elevation with the milled portion toward the observer at the right of the figure.

Fig. 2 is a similar view taken at an angle of 90° to Fig. 1,

Fig. 3 is an end view showing the cutting face of the tool and Fig. 4 is an enlarged fractional view of the milled wall showing the tool marks extending longitudinally of the tool.

The stock or body of the tool is denoted by 1, and that portion which is partially cut away by the milling tool to form the cutting edge, is denoted by 2. One cutting edge of the tool is denoted by 3, and from this edge the end of the portion 2 recedes in the direction of the arrow to a line 4, to give the desired clearance to the tool. The line 4 is substantially at right angles to the cutting edge 3, and the part 2 of the cutter is cut away from its end or cutting face upwardly, the cut-away portion vanishing finally at the point 5, forming a notch 6 having its two inner sides substantially at right angles to each other, the said notch, after extending from the end of the cutter a considerable distance, half the length of the part 2, more or less, gradually decreasing in cross area until it reaches the vanishing point at 5.

It will be observed that the cutting edge 3 and the material back of the cutting edge are materially reinforced by that part of the portion 2 of the tool, denoted in Fig. 3 by 7, which lies above the plane of the cutting edge as the Fig. 3 is presented. This increased backing adds stiffness to the tool so that its cutting edge will do its work more effectively, while a tool of a given diameter or cut will be materially stronger and less liable to break than where the part 7 referred to is cut away as has heretofore been common, and, furthermore, as there is no transverse grinding of the tool, the notch being formed by a milling tool cutting in the longitudinal direction of the present tool, there will be no transverse valleys formed to induce breakage. These longitudinal tool marks are shown in Fig. 4, and denoted by 9.

In addition to the cutting edge 3, the longitudinal edge 8 is also a cutting edge and comes into action when the tool is moved laterally during its rotary movement.

What I claim is:

1. A routing cutter having a notch extending longitudinally from its cutting edge toward its stock, the said notch having its walls at an angle to each other less than 180°, the tool marks on the walls of said notch extending in the longitudinal direction of the tool.

2. A routing cutter having a notch extending longitudinally from its cutting edge toward its stock, the walls of the notch being at an angle less than 180° to each other, said walls vanishing at their upper ends at the periphery of the stock and the tool marks on the walls of said notch extending in the longitudinal direction of the tool.

In testimony that I claim the foregoing as my invention, I have signed my name this 16th day of November, 1915.

VERNON E. ROYLE.

Copies of this patent may be obtained for five cents each, by addressing the "Commissioner of Patents, Washington, D. C."